(No Model.)

J. A. LEASE.
FARM GATE.

No. 243,712. Patented July 5, 1881.

Witnesses:
A. C. Guthrie
Frank W. Heers.

Inventor:
Jesse A. Lease,
By Thomas G. Orwig, Atty.

N. PETERS. Photo-Lithographer. Washington, D. C.

United States Patent Office.

JESSE A. LEASE, OF DES MOINES, IOWA.

FARM-GATE.

SPECIFICATION forming part of Letters Patent No. 243,712, dated July 5, 1881.

Application filed April 23, 1881. (No model.)

*To all whom it may concern:*

Be it known that I, JESSE A. LEASE, of Des Moines, in the county of Polk and State of Iowa, have invented an Improved Automatic Farm-Gate, of which the following is a specification.

The object of my invention is, first, to provide a means for adjusting a flexible gate so that it can be made to incline upward or downward relative to the ground and the post to which it is hinged, and also locked rigid at any angle or inclination desired; second, to provide an improved means for hanging the gate, and thereby facilitating the perpendicular and swinging movements of the gate that are required to automatically open and close it by the pressure of the wheels of passing vehicles upon the cranks; third, to increase the lever force of the operating-cranks, as power is thereby transmitted to the gate from the pressure of the wheels.

Heretofore flexible gates have been adjusted by means of single pivoted braces extending diagonally across the gate to a rack or other suitable fastening device.

My improvement consists in bending bracing-rods double and pivoting one doubled brace to each end of the gate, and at the bottom of the gate, to extend diagonally upward to a rack fixed on the top and center of the gate in such a manner that the braces may be readily adjusted to change the incline of the gate, and interlocked to brace and stiffen the gate.

Gates have been hung to posts by means of bearings attached to the fixed gate-posts and rods and anti-friction rollers; but in no instance have anti-friction rollers been combined with the bearers to engage pintles or journals extending vertically above and below the gate, to facilitate the vertical and also the swinging movements of the suspended gate, as contemplated by my improvement. An oscillating inclined plane has also been pivoted to a fixed gate-post, and connected with the gate by means of a roller-bearer and roller, and with wheel-irons or triple cranks placed at a distance from the gate by means of a double crank pivoted to the gate-post and connecting-rods. My improvement in this particular consists in combining levers direct with the operative cranks, to augment the force applied thereto for the purpose of lifting and operating the gate, as hereinafter fully set forth.

Figure 1:
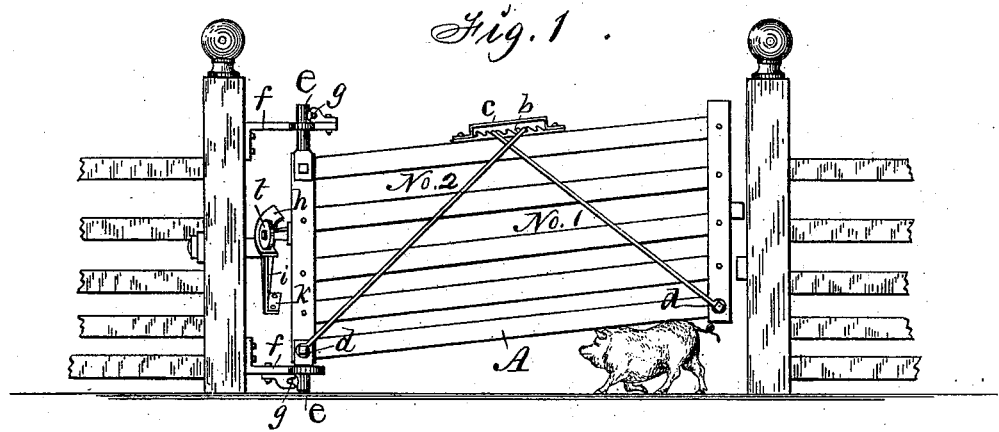
Figure 2:
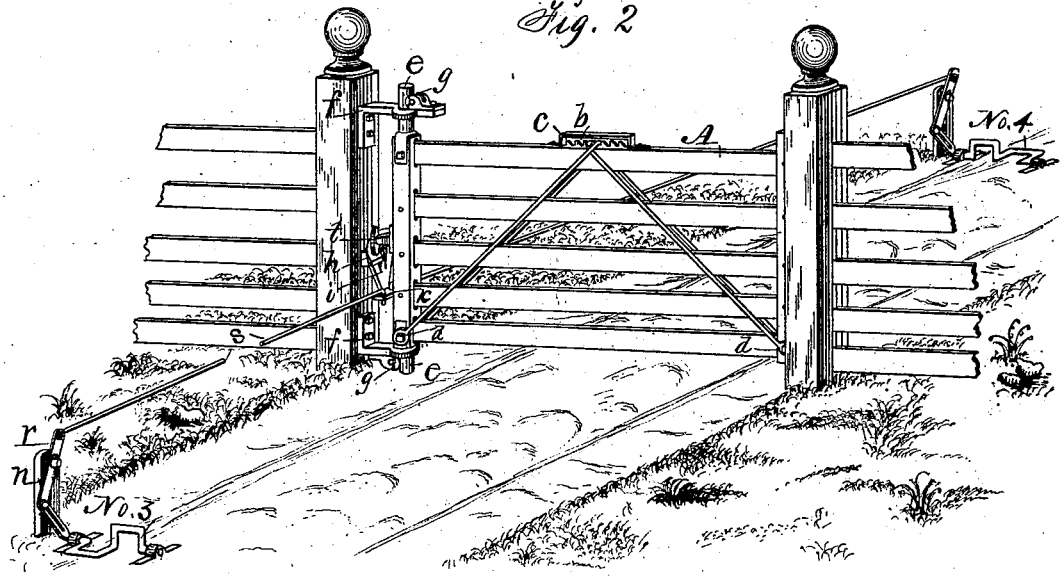
Figure 3:
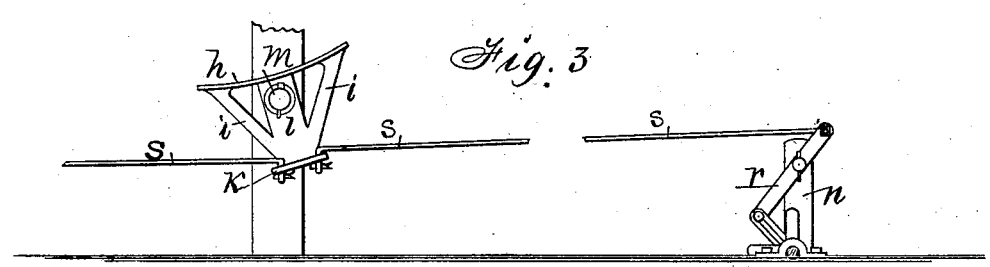

Figure 1 of my accompanying drawings is a side view of my gate, showing it suspended between two gate-posts and adjusted so that its front and free end is elevated, as required, to swing over snow and other obstructions, and to allow hogs to pass under it. Fig. 2 is a perspective view of the gate and its operative mechanism, showing the gate closed and its front end lowered, as required, to obstruct the passage of hogs by coming in close contact with the ground. Fig. 3 is a detail view of the operating mechanism. Together these figures clearly illustrate the construction and operation of my complete invention.

A represents a flexible gate composed of a series of horizontal bars pivoted to two vertical end pieces by means of bolts, or in any suitable way.

$b$ is a rack fixed on the top and central portion of the gate. Its series of teeth incline rearward.

$c$ is a metal cover in the form of a loop, connected with the gate and rack by means of screw-bolts in such a manner that it will protect the rack and also restrict the movements of the braces designed to be operated in combination with the rack.

No. 1 is a brace in the form of a double metal rod, having eyes $d$ formed at its open and lower end, by means of which eyes and a screw-bolt it is hinged to the front and lower corner of the gate in such a manner that it will be astride of the gate and its top and closed end adjustably connected with the rack $b$ $c$.

No. 2 is a corresponding brace pivoted to the rear end and lower corner of the gate, and connected with the rack in such a manner that it can be readily adjusted relative to the rack and the brace No. 1, as required, to retain the brace No. 1 in a fixed position and the flexible gate rigid at various angles relative to the ground and gate-posts.

$e$ $e$ are journals fixed to the top and bottom of the vertical portion of the rear end of the gate. They extend through eyes or bearings formed in bearers $f$, that are fixed to the gate-post in such a manner that the gate will be allowed to rise and descend, and also swing.

$g$ and $g'$ are anti-friction rollers attached to the bearers $f$, to facilitate the vertical movements of the journals $e$. The roller $g$ is placed on the top side and end of the upper bearer, $f$.

The roller $g'$ is placed on the under side of the lower bearer, $f$, and between the gate-post and the journal that it engages, as required, to co-operate with the roller at the top of the gate, for the purpose of keeping the gate perpendicular and preventing any undue friction upon its journals.

$h$ is an inclined plane, curved in such a manner that it can be pivoted to the gate-post in a concentric position relative to the axis of the swinging gate.

$i\ i$ are braces extending downward from the ends of the curved plane $h$, to be connected with a slotted plate or flange, $k$, at their lower ends.

$l$ is an arm or post extending vertically from the center of the plane $h$ to the center of the slotted flange $k$, to form a bearing through which a short axle extends horizontally, as required, to pivot and oscillate the plane $h$.

The parts $h\ i\ k\ l$ may be formed integral with each other in one casting, or formed separately and readily connected in any suitable way.

$m$ is a short axle fixed to the gate-post to receive and support the oscillating device $h\ i\ k\ l$.

$n\ n$ represent lever-bearers fixed in the ground, or to the platform upon which the triple cranks Nos. 3 and 4 are mounted.

$r\ r$ are levers, pivoted to the bearers $n$ in such positions relative to the triple cranks and oscillating inclined plane $h$ that their lower ends and long arms can be readily connected with the said cranks, and their upper ends and short arms with said oscillating plane in such a manner that the power applied by a passing wheel to tilt one of the cranks will be transmitted and augmented, by means of the levers and connecting-rods $s$, to the inclined plane, as required to move the plane, and thereby raise the gate preparatory to its swinging open or shut by force of gravity.

$t$ is a roller mounted on the end of a bearer that extends horizontally from the rear end of the gate in such a position relative to the inclined and oscillating plane $h$ that the roller will be allowed to rest upon it and support the weight of the gate when the gate is at rest, and to travel upon it as the gate swings open or shut.

In the practical operation of my invention the braces Nos. 1 and 2 can readily be adjusted, relative to each other and the rack on the gate, to raise or lower the front end of the gate, and the gate can be readily opened and closed by allowing the wheels of a passing vehicle to run against and turn down one of the triple cranks.

I claim as my invention—

1. The rack $b$, the cover $c$, and double adjustable braces Nos. 1 and 2, having eyes $d$, in combination with the flexible gate, substantially as shown and described, for the purposes specified.

2. The gate A, having journals $e$, the gate-bearers $f$, and the anti-friction rollers $g\ g'$, arranged and combined, substantially as shown and described, to operate in the manner as set forth, for the purposes specified.

3. In an automatic gate-operating mechanism, the combination of the lever $r$, supported by a fixed post and connected direct with a wheel-iron or triple crank, with a connecting-rod, $s$, substantially as shown and described, for the purposes specified.

4. The combination of a gate having journals $e$, operating in fixed bearers having anti-friction rollers $g\ g'$, the pivoted oscillating gate-carrying device $h\ i\ k\ l\ m$, the traveling roller $t$, the levers $r$, supported by fixed posts, the connecting-rods $s$, with the wheel-irons or triple cranks Nos. 3 and 4, substantially as shown and described, for the purposes specified.

JESSE A. LEASE.

Witnesses:
R. G. ORWIG,
J. M. SHUCK.